Patented Feb. 13, 1940

2,190,184

UNITED STATES PATENT OFFICE 2,190,184

PROCESS OF PRODUCING ALDEHYDE RESINS

Walter Frankenburger and Herbert Hammerschmid, Ludwigshafen - on - the - Rhine, and Georg Roessler, Oppau, Germany, assignors to I. G. Farbenindustrie Aktiengesellschaft, Frankfort-on-the-Main, Germany No Drawing. Application October 7, 1937, Serial No. 167,770. In Germany October 28, 1936

3 Claims. (Cl. 260—67)

The present invention relates to an improved process of producing aldehyde resins.

We have found that resins which yield polishes of specially good flexibility, elasticity and stability are obtained by condensing aliphatic aldehydes having at least two carbon atoms in the presence of capillary-active substances, i. e. substances which diminish the surface-tension of water or aqueous solutions with the aid of primary or secondary aliphatic amines or secondary heterocyclic bases or their salts as catalysts.

As suitable aliphatic aldehydes there may be mentioned in particular acetaldehyde, aldol and crotonaldehyde. Primary and secondary aliphatic amines and secondary heterocyclic bases, as for example methylamine, ethylamine, butylamine, cyclohexylamine, dimethylamine, diethylamine, dibutylamine, dicyclohexylamine, piperidine and their salts, especially with organic acids, such as lactic acid or acetic acid, are suitable as condensing agents. As substances having capillary-active properties there may be mentioned in particular those having a lipoid radicle and one or more hydrophilic groups. The lipoid radicle may consist for example of an aliphatic carbon chain having at least ten carbon atoms. Substances of the said kind are for example alkali salts of fatty acids having at least ten carbon atoms, ammonium bases having at least ten carbon atoms, such as trimethyl-dodecyl-ammonium hydroxide, salts of amines containing at least ten carbon atoms, such as dodecylamine hydrochloride, condensation products of hydroxy- or aminoalkyl sulphonic acids with fatty acids containing at least ten carbon atoms, such as condensation products of hydroxyethane sulphonic acid or taurine with lauric acid or stearic acid, polyalkoxy compounds of alcohols, amines, acids or mercaptans having at least ten carbon atoms which are formed by treatment of the alcohols, amines, acids or mercaptans concerned with alkylene oxides, true sulphonic acids or sulphuric esters of aliphatic alcohols containing at least ten carbon atoms, as for example lauryl alcohol, octodecyl alcohol, alkylated naphthalene sulphonic acids and also condensation products of naphthalene sulphonic acids and aldehydes.

The capillary-active substances may be added to the aldehydes before or during the condensation, as for example after completion of the first condensation stage but before the subsequent hardening by heating to high temperatures. The capillary-active substances probably take part in the condensation because they can no longer be isolated from the condensation products. In addition to the said capillary-active substances there may also be present during the condensation of the aldehydes other substances the co-employment of which has proved favorable in preparing aldehyde resins by other methods, as for example polyhydric alcohols, substances having readily movable hydrogen atoms, such as acetoacetic ester or malonic ester, or also resin acids. Similarly the resulting condensation products may be subjected to an aftertreatment as for example with condensing halides, with formaldehyde or substances yielding formaldehyde or by simple heating for long periods or by two or more of these measures together.

The products obtained may be used for the preparation of polishes in the same way as shellac. The polishes obtained are distinguished, as already mentioned, by especially good flexibility, elasticity and stability and in these respects are considerably superior to shellac polishes. The products may also be used in a corresponding manner for other purposes for which shellac is used, as for example as resins for sizing paper or as insulating substances, especially in admixture with mica.

The following examples will further illustrate how the present invention may be carried out in practice but the invention is not restricted to these examples. The parts are by weight.

Example 1

28 parts of acetaldehyde are slowly introduced into a mixture of 2 parts of water and 1.5 parts of diethylamine. Care is taken by cooling that the temperature does not exceed 60° C. The reaction mixture is then boiled for 2 hours. After separating the water, 0.4 part of a reaction product of 1 molecular proportion of sperm oil alcohol calculated with regard to an average molecular weight of the mixture of the alcohols as contained in the sperm oil employed, with 20 molecular proportions of ethylene oxide is dissolved in the reaction mixture. During the course of an hour, while the temperature is rising from 120° to 180° C., there is added 1 part of formic acid and during the course of another hour, at from 180° to 190° C., there is introduced 1 part of vaporized 30 per cent aqueous formaldehyde. There are obtained 21 parts of a pale resin having a softening point of 75° C. which is readily capable of being polished and yields excellent polishes.

Example 2

20 parts of crude aldol having a specific gravity of 1 are introduced into a mixture of 1.2 parts of water and 0.9 part of diethylamine, the resulting mixture being boiled for 2 hours under reflux. After adding 0.2 part of the reaction product of 1 molecular proportion of dodecyl alcohol and 8 molecular proportions of ethylene oxide, the mixture is further heated and water and readily volatile oily condensation products are separated by distillation. The temperature amounts to up to about 220° C. By then heating at 220° C. for an hour or by heating for six hours at from 180° to 190° C. there are obtained 12 parts of a resin having a softening point of 73° which is readily capable of being polished.

*Example 3*

80 parts of lactic acid diethyl amine salt are added within 20 minutes at 25° C. to a mixture of 2000 parts of pure crotonaldehyde and 25 parts of the sulphuric acid ester of octodecyl alcohol. Condensation takes place with evolution of heat, so that the temperature of the reaction mixture slowly rises. At about 90° C. which are reached by self-warming of the mixture, the condensation proceeds quickly with strong boiling of the mixture. When the temperature of the mixture does not rise further, the mixture is still kept boiling for 2 hours. Easily volatile constituents are then distilled off in an atmosphere of nitrogen while blowing in at from 120 to 180° C. 70 parts of formic acid and at about 200° C. 70 parts of formaldehyde. The reaction mixture is then further heated up to 230° C, while distilling off volatile constituents. 920 parts of a resin having a softening point of 74° C. thus remain as the residue. This resin is suitable for polishes, sound records and as electrical insulating material.

What we claim is:

1. The process for the production of artificial resins, which comprises condensing an aliphatic aldehyde selected from the group consisting of acetaldehyde, aldol and crotonaldehyde by means of a small amount of a member of the group consisting of primary and secondary aliphatic and cycloaliphatic amines and secondary heterocyclic bases and their salts, in the presence of a substance containing an aliphatic radicle with at least 10 carbon atoms and at least one hydrophilic group.

2. The process for the production of artificial resins, which comprises condensing an aliphatic aldehyde selected from the group consisting of acetaldehyde, aldol and crotonaldehyde by means of a small amount of a member of the group consisting of primary and secondary aliphatic and cycloaliphatic amines and secondary heterocyclic bases and their salts, while adding at any time before the end of the reaction a substance containing an aliphatic radicle with at least 10 carbon atoms and at least one hydrophilic group.

3. The process for the production of artificial resins, which comprises condensing an aliphatic aldehyde selected from the group consisting of acetaldehyde, aldol and crotonaldehyde by means of a small amount of a member of the group consisting of primary and secondary aliphatic and cycloaliphatic amines and secondary heterocyclic bases and their salts, in the presence of a polyglycol ether of an alcohol containing at least 10 carbon atoms.

WALTER FRANKENBURGER.
HERBERT HAMMERSCHMID.
GEORG ROESSLER.